US005763555A

United States Patent [19]
Skoglund

[11] Patent Number: 5,763,555
[45] Date of Patent: Jun. 9, 1998

[54] WATER-BORNE ACRYLIC EMULSION PRESSURE-SENSITIVE ADHESIVE COMPOSITIONS CONTAINING MULTIFUNCTIONAL MONOMER HAVING IMPROVED STABILITY AND REMOVABILITY

[75] Inventor: Michael J. Skoglund, Dublin, Ohio

[73] Assignee: Ashland Inc., Russell, Ky.

[21] Appl. No.: 589,769

[22] Filed: Jan. 22, 1996

[51] Int. Cl.$^6$ .................................................. C08F 20/10
[52] U.S. Cl. ................................................... 526/323.2
[58] Field of Search ........................................ 526/323.2

[56] References Cited

U.S. PATENT DOCUMENTS

| | | |
|---|---|---|
| 2,973,286 | 2/1961 | Ulrich . |
| 3,492,260 | 1/1970 | Samour et al. . |
| 3,509,111 | 4/1970 | Samour . |
| 3,836,512 | 9/1974 | Hartsdale . |
| 3,971,766 | 7/1976 | Ono et al. ............... 526/323.2 |
| 3,983,297 | 9/1976 | Ono et al. . |
| 3,988,392 | 10/1976 | Kameda et al. . |
| 3,998,997 | 12/1976 | Mowdood et al. . |
| 4,110,290 | 8/1978 | Mori et al. . |
| 4,151,147 | 4/1979 | Neuschwanter et al. . |
| 4,447,588 | 5/1984 | Rametta ................. 526/323.2 |
| 4,456,734 | 6/1984 | Lindner et al. . |
| 4,507,429 | 3/1985 | Lenney . |
| 4,513,118 | 4/1985 | Suetterlin et al. . |
| 4,590,068 | 5/1986 | Berthet et al. ........... 526/323.2 |
| 4,629,663 | 12/1986 | Brown et al. . |
| 4,735,990 | 4/1988 | Kihara et al. . |
| 4,791,184 | 12/1988 | Nagai et al. ............. 526/323.2 |
| 4,829,139 | 5/1989 | Mudge . |
| 4,925,908 | 5/1990 | Bernard . |

FOREIGN PATENT DOCUMENTS

| | | | |
|---|---|---|---|
| 0 391 343 | 3/1990 | European Pat. Off. . | |
| 53-64242 | 6/1978 | Japan ..................... | 526/323.2 |
| 61-141716 | 6/1986 | Japan ..................... | 526/323.2 |
| 62-275147 | 11/1987 | Japan ..................... | 526/323.2 |

OTHER PUBLICATIONS

*Synthesis and Properties of Polymeric Latex Particles and Their Conjugates with Human Immunoglobulin G* Kazuaki Marumoto and Tatsuo Suzuta Department of Immunology and Serology, Tokyo Medical College, Higashi–Okubo, Shinjuku–ku, Tokyo 160, Japan and Jhiromichi Noguchi and Yasuzo Uchida Department of Industrial Chemistry, Faculty of Engineering, The University of Tokyo, Jongo, Bunkyo–ku, Tokyo 113, Japan (Received 6 Jan. 1978; revised 1 Mar. 1978).

*Handbook of Pressure–Sensitive Adhesive Technology* pp. 310 through 418 Copyright 1982 by Van Nostrand Reinhold Company Inc. Molly Millars Lane Wokingham, Berkshire, England.

*Crosslinkable Vinyl and Acrylic Polymer Latices in Adhesive Applications—A Review* European Adhesives and Sealants Dec. 1986.

*The Applications of Synthetic Resin Emulsions* H. Warson, Chemical & Polymer Consultant Ernest Benn Limited, London 1972.

*Standard Test Method for Rubber, Raw—Determination of Gel, Swelling Index, and Dilute Solution Viscosity* ASTM, Designation D3616–93, pp. 536 through 540.

*Handbook of Pressure Sensitive Adhesive Technology*, 2nd Edition, Edited by Donatas Satas, p. 418.

*The Applications of Resin Emulsions*, H. Warson, pp. 286, 305 and 306.

JA 53–64242 by Nitto—Jun. 1978—In House Completely English–Translated Version.

*Primary Examiner*—Joseph L. Schofer
*Assistant Examiner*—N. Sarofim
*Attorney, Agent, or Firm*—Mary E. Picken

[57] ABSTRACT

A tacky pressure sensitive water-borne acrylic emulsion adhesive composition prepared with >1% multifunctional monomer has Tg<0° C., >90% gel content and is web coatable. The dried adhesive film anchors readily and remains easily removeable from diverse substrates.

10 Claims, No Drawings

WATER-BORNE ACRYLIC EMULSION PRESSURE-SENSITIVE ADHESIVE COMPOSITIONS CONTAINING MULTIFUNCTIONAL MONOMER HAVING IMPROVED STABILITY AND REMOVABILITY

BACKGROUND OF THE INVENTION

Removeable adhesives are used on signs, temporary consumer labels, stickers, inventory tracking labels and energy labels for appliances.

Removable pressure-sensitive adhesive application requirements dictate that the adhesive exhibit sufficient peel force and tack to anchor to the desired substrate but also remain cleanly and readily removable even after extended periods of time. Any significant increase in bond strength, as measured by peel force, over time is undesirable in these applications.

Acrylic pressure sensitive adhesives prepared from homopolymers or copolymers of low glass transition temperature (Tg), such as n-butyl acrylate and 2-ethylhexyl acrylate, exhibit sufficient tack for pressure sensitive adhesive applications, but typically develop significant increases in bond strength to substrates over time.

Bond strength is determined by the affinity of the pressure sensitive adhesive for the substrate, the initial tack of the adhesive, and the internal cohesive strength of the adhesive polymer film. The molecular weight of the adhesive polymer has a profound effect on adhesive properties. The peel force developed by a pressure sensitive adhesive develops a maximum cohesive failure mode value as the molecular weight of the polymer is increased. As the molecular weight is further increased, the failure mode becomes adhesive and the peel force decreases with increasing molecular weight. This adhesion phenomenon can be explained in terms of adhesive polymer cohesive strength and the surface wetting of the substrate by the adhesive polymer as described in H. Warson, *The Application of Synthetic Resin Emulsions,* Chapter 6 Adhesives, Ernest Benn Limited, London, 1972 and D. Satas, *Handbook of Pressure-Sensitive Adhesive Technology,* Chapter 13 Acrylic Adhesives, Van Nostrand Reinhold Co., 1982.

Removable pressure sensitive adhesives require that the cohesion of the adhesive be greater than the adhesion to the substrate. Adhesives with high cohesive strength can be prepared with controlled crosslinking during the polymerization process, by a controlled secondary intrapolymer reaction, or by hydrogen bonding. An example of the controlled crosslinking method is the use of a polyglycol dimethacrylate (e.g. tetraethyleneglycol dimethacrylate) (H. Warson, *The Application of Synthetic Resin Emulsions,* pages 286, 305, and 306, Adhesives, Ernest Benn Limited, London, 1972.)

U.S. Pat. No. 3,492,260 (Samor & Satas, Kendell) discloses the use of crosslinking monomers in the preparation of acrylic emulsion pressure sensitive adhesives. The preferred crosslinking monomer is polyethylene glycol dimethacrylate. Polyethylene glycol dimethacrylate was incorporated into the polymer at the level of 4.1 parts. The molecular weight of the polyethylene glycol acrylate is not disclosed. The uncured gel content is reported to be only 41 percent.

U.S. Pat. No. 3,836,512 (Chu, Union Carbide) describes the optional use of up to 2 mole percent crosslinking monomer, including di(meth)acrylates, in the homogeneous copolymerization of water soluble and water insoluble olefinically unsaturated monomers in the presence of a dispersing agent, redox catalyst system, a liquid hydrocarbon, emulsifier, and electrolyte. Compositions containing only 16 to 50 mole percent water insoluble olefinically unsaturated monomer (i.e. acrylate esters) are described. Alkali swellable polymer gels were obtained.

U.S. Pat. No. 3,971,766 (Ono et al., Teijin Ltd.) describes an acrylic pressure sensitive adhesive containing 0.002 to 0.05 mole percent of a polyfunctional monomer, (i.e. polyethylene glycol dimethacrylate). The '766 patent states "If the amount of the polyfunctional compound is more than 0.05 mol %, gellation occurs at the time of polymerization, and the resulting copolymer cannot be applied to a base sheet as an adhesive." The solvent based polymerizations contain up to 0.3 parts by weight polyethylene glycol dimethacrylate.

U.S. Pat. No. 3,998,997 (Mowdood et al., Goodyear) describes an acrylic emulsion pressure sensitive adhesive polymer prepared with di, tri, or tetra functional vinyl monomers including polyethylene glycol dimethacrylate, tetra ethylene glycol diacrylate, 1,6 hexane diol diacrylate, diethylene glycol diacrylate, trimethylol propane triacrylate, triethylene glycol diacrylate, triethylene glycol dimethacrylate, pentaerythritol tetra acrylate, pentaerythritol tetra methacrylate, dimethyl amino ethyl diacrylate, dimethyl amino ethyl dimethacrylate, and 1,3 butane glycol dimethacrylate at levels up to 0.3 parts. Example 11 is an acrylic emulsion pressure sensitive polymer preparation containing 0.04 parts ethylene glycol dimethacrylate.

U.S. Pat. No. 4,151,147 (Chris et al., Celanese) describes a process for preparing an all acrylic copolymer latex where the polymerization is promoted by the use of a multifunctional acrylate monomer at the level of 0.1 to 1.0%, and preferably at 0.5% of the weight of the total comonomer charge. The examples show trimethylol triacrylate at 0.5 percent.

The limitation on the use of multifunctional acrylate monomers to obtain cross linked acrylic polymer adhesive in a stable emulsion form was summarized by Warson. "In some cases a limited amount of a polyfunctional monomer, such as ethylene glycol dimethacrylate, may be included. The effect of the this difunctional monomer is limited since if more than a few percent are included with the other acrylic monomers, the emulsion will precipitate during the polymerization reaction, whilst the addition of a molecular weight controller, of which dodecyl mercaptan is an example, will mitigate against the usefulness of the multifunctional monomer." (H. Warson, *Crosslinkable Vinyl and Acrylic Polymer Latices in Adhesive Applications—A Review,* European Adhesives and Sealants, December 1982).

U.S. Pat. No. 4,507,429 (Lenny, Air Products) describes a pressure sensitive adhesive composition of an acrylate and/or vinyl ester, an olefinically unsaturated carboxylic acid monomer, and a polyolefinically unsaturated copolymerizable monomer. This polyfunctional monomer can be a polyvinyl or polyallylic monomer used in a small proportion, in general from about 0.1 to 0.4 weight percent.

U.S. Pat. No. 4,513,118 (Sutterlin et al) describes the copolymerization of di, tri, and tetra methacrylates at levels of 0.2 to 3.0 percent by weight in the second stage of a three stage process for producing thermoplastic impact modifiers.

Additional limitations on the use of multifunctional acrylate monomers have been reported. "Other observations indicate that a small amount of polyethylene[glycol] dimethacrylate is an effective cross-linker in the presence of acrylic or methacrylic acid, but not alone. The use of a larger quantity of the cross-linking monomer resulted in a gel in the case of a solution polymer or a grainy adhesive in the case of an emulsion polymer. Generally, only a few percent of a difunctional cross-linking agent can be used, as a larger amount causes the precipitation of latex particles." (D. Satas, *Handbook of Pressure-Sensitive Adhesive Technology*, 2nd Edition, page 418, Van Nostrand Reinhold Co., 1989).

U.S. Pat. No. 4,735,990 (Kihara et al, Nitto Electric) discloses emulsion polymers prepared with an fluoroalkyl esters of acrylic acid, an acrylic acid derivative, and a polyfunctional monomer for internal cross linking. Emulsion polymerizations where conducted under dilute conditions affording solid content of about 20 to 25 weight percent. I to 10 percent by weight polyfunctional monomer is used for internal crosslinking the fluoroalkyl acrylic ester emulsion polymers. Copolymerization of triethylene glycol dimethacrylate at 3.7 weight percent of the polymer is exemplified.

Marumoto and Suzuta (*Polymer*, 19, 867–871, 1978) describes the preparation of a methylmethacrylate emulsion polymer at 16 weight percent solids containing 3 weight percent on monomer ethylene glycol dimethacrylate.

U.S. Pat. No. 4,829,139 (Mudge, National Starch) describes the preparation of permanently tacky pressure sensitive adhesive terpolymers made from vinyl esters, ethylene, and maleate or fumarates. The method of preparation uses 0 to 3% by weight of butanediol diacrylate.

E. P. 391,343 (Shah et al, Goodrich) describes an acrylic emulsion polymer with a number average particle size of 600 Angstroms or less, a glass transition temperature Tg of 200° C. or less, containing 2 to 6 weight percent olefinically unsaturated carboxylic acid monomer and 0.05 to 10 weight percent diacrylate or dimethacrylate ester of an aliphatic diol. The preferred amount of di(meth)acrylate is 0.1 to 1.0 weight percent.

An example of the preparation of a stable acrylic emulsion pressure sensitive adhesive polymer containing limited amounts (i.e. up to one percent) is described in U.S. Pat. No. 4,925,908 (Bernard et al, Avery). The '908 patent says multifunctional acrylate monomers can be used to control gel content of the polymer adhesive. The '908 patent also says "the amount of multifunctional acrylate monomer should not exceed about one percent as such amounts tend to reduce the stability of the acrylic-based emulsion from which the polymers are prepared, resulting in coagulation of the emulsion particles during preparation".

The '908 patent stabilization system is a protective colloid (VINOL 540 high molecular weight polyvinyl alcohol 87 to 89% hydrolyzed) used at 0.5 to 1.0%, a TRITON X-200 anionic emulsifier sodium octoxynol-2-ethane sulfonate used at 1.8 to 2.1%, and a TRITON N-111, Nonoxynol-11 nonionic emulsifier used at 0.5 to 2.0%. The patent says that when the anionic emulsifier is less than 1.5% the emulsion loses stability and when the nonionic emulsifier is less than 0.5% the emulsion loses stability. The '908 patent says the polyvinyl alcohol must be greater than 0.5% since "compositions having less than 0.5 percent by weight of the protective colloid are not preferred because such compositions tend to exhibit too great of an adhesion buildup on some substrates".

SUMMARY OF THE INVENTION

It has now been found that stable high solids water-borne acrylic emulsion pressure sensitive adhesive polymers of low coagulum can be prepared with multifunctional monomers well above the 1.0 weight percent of the polymer. Surprisingly, these low coagulum, stable emulsion polymers can be prepared with no protective colloid, no nonionic emulsifier and less than 1.5% anionic emulsifier.

These removable adhesive compositions have the advantage of not requiring a protective colloid polyvinyl alcohol to prevent increase in peel force on various substrates. Advantageously, the low level of emulsifier also affords improvements in foam reduction during web coating operations, makes the coated adhesive film less sensitive to humidity and substantially reduces surfactant residues or "ghosting" remaining on the substrate after the adhesive is removed.

This invention departs from the '908 patent, in that, over 1.0 weight percent multifunctional monomer is incorporated into the emulsion polymer adhesive and the polymer is stable and very low in polymer coagulum, has a gel content above 90 percent, exhibits excellent anchorage to a variety of substrates, exhibits excellent removability without the use of a protective colloid, and is a stable emulsion without the use of a nonionic emulsifier with less than 1.5% anionic emulsifier.

DESCRIPTION OF THE INVENTION

Water-borne acrylic emulsion polymers, that excel at removable pressure sensitive adhesive applications, are composed of an acrylic copolymer with a Tg of less than 0° C. and are prepared with greater than one part per hundred, on total monomer content, of a monomer containing multiple and reactive olefinic moieties. The polymer gel content is greater than 90 weight percent and a polymerized polymer solids content of 40 to 60 weight percent is obtained. A calculated Tg of less than −40° C. is preferred and a calculated Tg of less than −60° C. is most preferred. The copolymer is composed of about 50 to about 99 parts of at least one alkyl acrylate monomer having from one to about twelve carbon atoms in the alkyl chain, and more than one weight percent multifunctional monomer.

Among useful monofunctional acrylate monomers in the practice of this invention are n-butyl acrylate, iso-butylacrylate, n-hexyl acrylate, n-octyl acrylate, 2-ethylhexyl acrylate, n-decyl acrylate, iso-decyl acrylate and n-lauryl acrylates. The preferred monofunctional alkyl acrylate is 2-ethylhexyl acrylate.

The multifunctional monomer is a cross linking monomer selected from a group of multifunctional monomers including diacrylates (ethylene glycol diacrylate, propylene glycol diacrylate), dimethacrylates (ethylene glycol diacrylate, diethylene glycol dimethacrylate, and 1,3 butane glycol dimethacrylate), trimethacrylates (pentaerythritol trimethacrylate and trimethylolpropane trimethacrylate), divinyl benzene, or monomers with multiple olefinic unsaturations that are reactive under the conditions of free radical emulsion polymerization. 1,3 butanediol dimethacrylate is the preferred multifunctional monomer because the monomer has allowance under 21 CFR 175.105.

The aqueous acrylic emulsion polymers of this invention can also include the polymerization product of an alkyl ester of acrylic acid and olefinically multifunctional monomer in optional admixture with other polymerizable monomers from the group of alkyl esters of methacrylic acid, styrene, vinyl and vinylene halides, allyl esters of unsaturated monocarboxylic acids, vinyl esters, vinyl ethers, hydroxyl containing alkyl esters of acrylic and methacrylic acid, dialkyl esters of monoethylenically unsaturated dicarboxylic acids, ethylenically unsaturated monocarboxylic and polycarboxylic acids and the anhydrides, nitriles, unsubstituted and substituted (including N-substituted) amides of all the said acids. The emulsion polymer of this invention may be prepared with an optional amount of a polar monomer such as hydroxyl containing alkyl esters of acrylic and methacrylic acid. Polar monomers include acrylic acid, methacrylic acid, itaconic acid, maleic acid, hydroxy ethyl acrylate, hydroxy ethyl methacrylate, hydroxy propyl acrylate, acrylonitrile, and substituted acrylamides. The emulsion polymer may be prepared in the absence of a polar monomer. The preferred polar monomer is acrylamide.

Although the emulsion polymer may be prepared in the presence of many surface-active components such as nonionic, anionic surfactants, protective colloids or reaction modifiers such as mercaptans (D. C. Blackley, *Emulsion Polymerization Theory and Practice*, Applied Science Publishers LTD London, 1975), the emulsion polymer is preferably prepared in the essential absence of a protective colloid, such as polyvinyl alcohol or hydroxyethyl cellulose, and preferably with less than 1.5 weight percent on monomer of surfactant. The preferred surfactant is anionic, although other surfactants employed in emulsion polymerization that are listed in the Gower "Handbook of Industrial Surfactants" can be used. The preferred surfactant type is an alkylated benzene sulfonate. The preferred surfactant is sodium dodecylbenzene sulfonate.

The aforementioned polymer emulsions can be prepared free of coagulum, reactor fouling, and are stable for extended periods of time. Combined with common wetting agents, anti-foams, and rheology modifiers, these acrylic emulsion polymers are shear stable, and thus can be mechanically coated on films, papers, and fabrics by rod, roll, knife, and slot methods (D. Satas, *Handbook of Pressure-Sensitive Adhesive Technology*, 2nd Edition, Chapter 34, Van Nostrand Reinhold Co., 1989). Additionally, these emulsion polymers are excellent film formers, affording clear and uniform pressure sensitive adhesive films that are devoid of defects and discontinuities.

In the following examples all units are in the metric system unless otherwise noted. All references mentioned herein are expressly incorporated by reference.

EXAMPLE I

An acrylic emulsion polymer pressure sensitive adhesive was prepared with the following monomer emulsion containing 5 weight percent multifunctional monomer of the total monomer weight and 4 mole percent multifunctional monomer of the total moles of monomer.

|  | pphm | grams |
|---|---|---|
| REACTOR CHARGE | | |
| Deionized water | 35.0 | 525.0 |
| Monomer Emulsion (3%) | | 66.3 |
| MONOMER EMULSION | | |
| Deionized Water | 43.0 | 720.0 |
| Sodium Bicarbonate | 0.25 | 3.8 |
| Sodium Dodecylbenzene Sulfonate | 1.0 | 15.0 |
| 2-Ethylhexyl Acrylate | 94.0 | 1410.0 |
| Acrylamide, 50% Aqueous | 2.0 | 30.0 |
| 1,3 Butanediol Dimethacrylate | 5.0 | 75 |
| BISULFITE SOLUTION | | |
| Deionized Water | 5.0 | 75.0 |
| Sodium Bisulfite | 0.06 | 0.9 |
| PERSULFATE SOLUTION | | |

-continued

|  |  |  |
|---|---|---|
| Deionized Water | 4.9 | 72.9 |
| Sodium Persulfate | 0.2 | 3.0 |
| HYDROPEROXIDE SOLUTION | | |
| Deionized Water | | 10.0 |
| Tert-Butyl Hydroperoxide, 70% Aqueous | | 1.5 |
| SULFOXYLATE SOLUTION | | |
| Deionized Water | | 10.0 |
| Sodium Formaldehyde Sulfoxylate | | 1.5 |
| RINSE WATER | | |
| Deionized Water | | 80.0 |
| BIOSTAT | | |
| KATHON LX 1.5% | | 3.0 |

| COMPOUNDING | pph |
|---|---|
| Emulsion Polymer C5729-99 | 100.0 |
| SURFYNOL SE wetting agent | 3.0 |
| PLURONIC L-101 Premix | 2.0 |
| COLLOIDS 646 defoamer | 0.4 |
| POLACRYL BR-100 associative thickener Premix | 0.3 |

Deionized water had a conductivity of 1.0 μS or less.

RHODACAL DS-10 Sodium Dodecylbenzene Sulfonate is supplied as a flake by Rhone-Poulenc.

MHOROMER MFM-407 1,3 Butanediol Dimethacrylate is monomer supplied by Rohm Tech Inc.

PLURONIC L-101 nonionic ethylene oxide propylene oxide block polymer wetting agent supplied by BASF Corporation. A premix was prepared with one part deionized water, one part isopropanol, and 2 parts PLURONIC L-101.

SURFYNOL SE wetting agent supplied by Air Products.

POLYACRYL BR-100 associative thickener supplied by POLACRYL Inc. A premix was prepared with one part deionized water, one part mono-butyl glycol ether, and 2 parts POLYACRYL BR-100.

COLLOIDS 646 defoamer supplied by Rhone-Poulenc.

A jacketed PYREX reactor equipped with nitrogen purge, stirrer, and addition ports was charged with deionized water which was heated to 74° C. The monomer emulsion ingredients were combined for a reactor feed. The reactor was charged with 3% of the monomer emulsion and 5% of the bisulfite and 5% persulfate solutions. After the initial exotherm subsided the remainder of the monomer emulsion, bisulfite solution, and persulfate solution were fed at a constant and continuous rate over a three hour period with a reaction temperature of 78° C. The resulting emulsion polymer was held at 80° C. for one hour, the hydroperoxide and sulfoxylate solutions were added seperately then the latex was cooled to 30° C. Biostat was added.

This emulsion polymer was labeled C5729-99 and had a nonvolatile content of 51.2 wt %, pH of 7.6, Brookfield RV viscosity of 40 cps at 50 rpm, consecutively filtered coagulum of 41 ppm on 100 mesh filter, 145 ppm on 200 mesh filter, and 152 ppm on 325 mesh filter. The average particle size was determined by a Coulter N-4 to be 500 nm. The total gel content was 91.6 weight percent. Since the emulsion polymer was prepared with 1.0 weight percent sodium dodecylbenzene sulfonate, the gel content of the polymer is estimated to be 92.5 weight percent. The emulsion polymer was compounded mixing the listed compounding ingredients to afford a coater ready pressure sensitive adhesive labeled C5729-103. The adhesive was coated on to POLY SLIK 8024 release liner at a coating weight of 0.7±0.1 mils dry thickness and laminated to a primed 60 lb paper face stock.

EXAMPLE 2

U.S. Pat. No. 4,925,908 example number one was prepared.

| | '908 Example 1 grams | pphm | Example 2 grams |
|---|---|---|---|
| REACTOR CHARGE | | | |
| Deionized Water | 90.0 | 22.50 | 337.5 |
| Tetrasodium Pyrophosphate | 1.2 | 0.300 | 4.5 |
| AEROSOL MA-80 surfactant | 0.1 | 0.025 | 0.4 |
| Monomer Emulsion | 29.0 | 7.250 | 108.8 |
| MONOMER EMULSION | | | |
| Deionized Water | 130.0 | 32.5 | 487.5 |
| TRITON X-200 | 30.0 | 7.5 | 112.5 |
| TRITON N-111 | 6.0 | 1.5 | 112.5 |
| 2-Ethylhexyl Acrylate | 240.0 | 60.0 | 900.0 |
| Butyl Acrylate | 152.0 | 38.0 | 570.0 |
| Methacrylic Acid | 8.0 | 2.0 | 30.0 |
| Dioctyl Azelate | 8.0 | 2.0 | 30.0 |
| 1,6 Hexanediol Diacrylate | 0.8 | 0.2 | 3.0 |
| t-Butyl Hydroperoxide | 0.4 | 0.1 | 1.5 |
| INITIATOR SOLUTION A | | | |
| Deionized Water | 6.0 | 1.5 | 22.5 |
| Potassium Persulfate | 0.2 | 0.05 | 0.8 |
| Ferric Sodium Edetate | 0.03 | 0.008 | 0.11 |
| INITIATOR SOLUTION B | | | |
| Deionized Water | 80.0 | 20.0 | 300.0 |
| Sodium Formaldehyde Sulfoxylate | 0.40 | 0.10 | 1.5 |
| PVOH SOLUTION | | | |
| AIRVOL 540, 10% Aqueous | 30.0 | 7.5 | 112.5 |
| Initiator Solution B | 32.0 | 8.0 | 120.0 |
| BICARBONATE SOLUTION | | | |
| Deionized Water | 12.0 | 3.0 | 45.0 |
| Sodium Bicarbonate | 1.0 | 0.25 | 3.7 |

AIRVOL 540 is a partially hydrolyzed polyvinyl alcohol supplied by Air Products and Chemicals Inc. A 10% aqueous solution was prepared in accordance with *VINOL® Polyvinyl Alcohol Dissolving Techniques*, Air Products and Chemical, Inc. Bulletin 152–511, 1982, 1985.

A jacketed PYREX reactor equipped with nitrogen purge, stirrer, and addition ports was charged with deionized water, tetrasodium pyrophosphate, and AEROSOL surfactant MA-80 and heated to 40° C. The monomer emulsion ingredients where combined for a reactor feed. The reactor was charged with 5% of the monomer emulsion and heated to 40° C. Initiator solution A was added. After two minutes, 2% of initiator solution B was added.

An exotherm was observed to last eight minutes with a peak temperature of 50° C. The reactor jacket was maintained at 40° C. during the following delayed feeds. After the initial exotherm subsided the remainder of the monomer emulsion was added a rate of 5.6 g/min and initiator solution B was added at a rate of 1.80 g/min. After 10 mins the monomer emulsion feed rate was increased to 11.3 g/min or a 5 hour delayed addition time. After 60% of the monomer emulsion was added, and after three hours, the PVOH solution was mixed with the remainder of initiator solution B to afford initiator solution C. Initiator solution C was added at a rate of 3.75 g/min. Simultaneously, the bicarbonate solution was added at a rate of 3.75 g/min. Agitation was increased to maintain mixing as viscosity increased. Dilution water, 325 grams, was added during the last hour of delayed feeds to maintain surface movement. At the end of delayed feeds, the reaction temperature was raised to 60° C. and held for 0.5 hours. The resulting emulsion polymer was cooled to 30° C. and discharged to afford 3307 grams.

This emulsion polymer was labeled C5777-11 and a nonvolatile content of 46.8 wt %, pH of 6.5, Brookfield RV viscosity of 3100 cps at 200 rpm, consecutively filtered coagulum of 21 ppm on 100 mesh filter, 35 ppm on 200 mesh filter, and 40 ppm on 325 mesh filter. The average particle size was determined by a Coulter N-4 counter to be 660 nm.

The U.S. Pat. No. 4,925,908 example 1, example 3 here, pressure sensitive adhesive was coated on to POLY SLIK 8024 release liner at a coating weight of 0.7±0.1 mils dry thickness and laminated to a primed 60 lb paper face stock. The one inch wide strips of the of the example 1 and 2 adhesive lamination were applied to a variety of substrates at 72° F. and 158° F. and evaluated according to PSTC-2 900 peel force measurement in pounds after a specific dwell period. The following is a summary of the results.

| SUBSTRATE | EXAMPLE 1 | EXAMPLE 2 U.S. 4,925,908 EXAMPLE 1 |
|---|---|---|
| Dwell Time: 20 mins Dwell Temperature: 72° F. | | |
| Stainless Steel | 0.4 | 0.9 |
| Aluminum | 0.1 | 0.7 |
| Enamel | 0.3 | 1.0 |
| Glass | 0.2 | 0.7 |
| SMC | 0.2 | 1.0 |
| high density polyethylene HDPE | 0.4 | 0.5 |
| Polypropylene | 0.3 | 0.7 |
| Polystyrene | 0.5 | 0.9 |
| Polycarbonate | 0.1 | 1.2 |
| Polymethylmethacrylate | 0.1 | 1.2 |
| Polyvinyl Chloride | 0.4 | 1.0 |
| acrylonitrile-butylene styrene ABS | 0.1 | 0.9 |
| Formica | 0.1 | 0.6 |
| 60 lb Gloss Krome Coat | 0.5 D | 0.8 PT |
| Envelope | 0.1 | 0.4 |
| Manila | 0.1 | 0.5 |
| Recycled Box Board | 0.1 | 0.4 |
| Calandered Vinyl | 0.1 | 0.9 PT |
| Polyethylene coated Paper | 0.1 | 0.3 |
| Dwell Time: One Week Dwell Temperature: 72° F. | | |
| Stainless Steel | 0.7 D | 1.0 |
| Aluminum | 0.2 | 0.9 |
| Enamel | 0.4 | 1.0 |
| Glass | 0.7 | 0.9 |
| SMC | 0.3 | 1.2 |
| HDPE | 0.5 | 0.7 |
| Polypropylene | 0.6 | 0.7 |
| Polystyrene | 0.6 D | 1.0 |
| Polycarbonate | 0.1 | 1.0 |
| Polymethylmethacrylate | <0.1 | 1.0 PT |
| Polyvinyl Chloride | 0.2 | 0.8 PT |
| ABS | 0.2 | 0.6 PT |
| Formica | 0.3 | 0.7 |
| 60 lb Gloss Krome Coat | 0.7 D | 0.5 PT |
| Envelope | 0.4 | 0.5 |
| Manila | 0.4 D | 0.7 |
| Recycled Box Board | <0.1 | 0.5 |
| Calandered Vinyl | 0.2 | 0.8 D |
| Polyethylene coated Paper | 0.1 | 0.3 |
| Dwell Time: One Week Dwell Temperature: 122° F. | | |
| Stainless Steel | 0.6 | 0.9 |
| Aluminum | 0.4 | 1.0 |
| Enamel | 0.7 | 0.7 PT |

-continued

| SUBSTRATE | EXAMPLE 1 | EXAMPLE 2 U.S. 4,925,908 EXAMPLE 1 |
|---|---|---|
| Glass | 0.7 D | 0.9 |
| SMC | 0.3 | PT |
| HDPE | 0.4 | 0.7 |
| Polypropylene | 0.6 | 1.0 |
| Polystyrene | 0.7 D | 0.7 PT |
| Polycarbonate | 0.2 | 0.8 PT |
| Polymethylmethacrylate | 0.2 | 0.4 PT |
| Polyvinyl Chloride | 0.4 | 0.2 PT |
| ABS | 0.6 | 1.1 PT |
| Formica | 0.2 | 0.8 |
| 60 lb Gloss Krome Coat | 0.6 PT | 0.5 PT |
| Envelope | 0.3 | 0.9 |
| Manila | 0.4 | 0.9 |
| Recycled Box Board | 0.1 | 0.6 |
| Calandered Vinyl | 0.1 | 0.6 PT |
| Polyethylene coated Paper | 0.2 | 0.8 |

All adhesive peels are clean from the substrate unless otherwise noted.
PT=Paper Tear
D=Delamination
F=Fell Off This comparison demonstrates that the adhesive of this invention possesses excellent utility as a removable adhesive compared to U.S. Pat. No. 4,925,908. The invention provides a transfer coatable water-borne emulsion pressure sensitive adhesive that remains easily removable from a wide array of substrates. The adhesive film possesses sufficient tack to anchor, but will not build excessive bond to the substrate. This allows for easy, clean removabiltiy. These advantageous properties are obtained by the use of greater then one weight or mole percent on monomer of a multifunctional crosslinking monomer.

I claim:

1. A removable adhesive film composition having less than 0.7 pounds per inch peel force comprising the dried residue of a pressure sensitive adhesive blend of an emulsion polymer having about 92% gel content comprising by weight 50 to 99 parts monofunctional acrylate monomer having one to twelve carbon atoms in the alkyl chain, more than 1 part multifunctional acrylate monomer, and 2 parts polar monomer, prepared in the absence of nonionic emulsifier.

2. The film of claim 1 wherein said monofunctional acrylate monomer has 4 to 8 carbon atoms in the alkyl chain.

3. The film of claim 1 wherein said monofunctional acrylate monomer is n-octyl acrylate, isoctyl acrylate, or 2-ethylhexyl acrylate.

4. The film of claim 1 wherein said polar monomer is acrylamide.

5. The film of claim 1 wherein said emulsion polymer has a glass transition temperature (Tg) below 0° C.

6. The film of claim 1 wherein said multifunctional acrylate monomer is 1,3 butanediol dimethacrylate.

7. The film of claim 1 wherein said emulsion polymer has a Tg of −70° C. to 0° C.

8. The film of claim 1 wherein said emulsion polymer has a Tg of −70° C. to −50° C.

9. The film of claim 8 wherein said emulsion polymer has more than 25 percent polymer solids content.

10. The film of claim 1 wherein said emulsion polymer number average particle diameter is greater than 100 nanometers.

* * * * *